United States Patent [19]

Hattori

[11] 4,196,322
[45] Apr. 1, 1980

[54] REAR WINDOW WASHER WIPER OPERATING SWITCH

[75] Inventor: Yoshio Hattori, Tokyo, Japan

[73] Assignee: Niles Parts Co., Ltd., Japan

[21] Appl. No.: 921,089

[22] Filed: Jun. 30, 1978

[30] Foreign Application Priority Data

Jul. 15, 1977 [JP] Japan .................................. 52-94041

[51] Int. Cl.² ........................ H01H 9/00; H01H 15/00
[52] U.S. Cl. ................................ 200/5 R; 200/16 R; 200/16 C
[58] Field of Search ............... 200/4, 16 R, 16 C, 160, 200/16 E, 16 F, 61.27, 61.54, 5 R

[56] References Cited

U.S. PATENT DOCUMENTS

| | | | |
|---|---|---|---|
| 2,528,035 | 10/1950 | Clayton | 200/16 C |
| 3,209,088 | 9/1965 | Wanlass et al. | 200/16 C |
| 3,511,943 | 5/1970 | Kibler | 200/4 |
| 3,934,101 | 1/1976 | Jones | 200/61.54 X |
| 4,115,670 | 9/1978 | Chandler | 200/16 R X |

Primary Examiner—James R. Scott
Attorney, Agent, or Firm—Lane, Aitken & Ziems

[57] ABSTRACT

A rear window washer wiper control comprising a first movable member and a second movable member, the movable members comprising a slide switch for a washer circuit and a slide switch for a wiper circuit. Both switches are incorporated in one case to energize a wiper motor by moving the second movable member to the right and also to push and move the second movable member accordingly when the first movable member is moved to the right, thereby working a washer motor and a wiper motor simultaneously.

Once an operating piece of the first movable member is released, the first movable member is forced back to the original position thereof by virtue of a built-in spring for automatic resetting, thus resulting in the washer motor stopping. The wiper motor continues to work so long as the second movable member is not manually reset to the original state thereof.

5 Claims, 2 Drawing Figures

REAR WINDOW WASHER WIPER OPERATING SWITCH

BACKGROUND OF THE INVENTION

1. Field of the Invention

This invention relates to a rear window washer wiper operating switch having the first movable member and the second movable member provide for operating a slide switch for a washer circuit and a slide switch for a wiper circuit which are contained in one case and arranged so as to enable both switches to be operated independently and/or cooperatively by manual operation.

2. Description of the Prior Art

The conventional rear window washer wiper operating switch of the prior art has been such that a washer switch and a wiper switch which work independent of each other have merely been installed in parallel.

According to the prior art, for working the washer switch and the wiper switch, these switches have had to be operated individually and accordingly there has been inconvenience in the operation with difficulty in quick practice.

Further, the conventional operating switch has incurred various shortcomings, for example, the construction thereof is intricate, difficulty lies in the workmanship and so forth.

SUMMARY OF THE INVENTION

It is a principal object of the present invention to provide a novel rear window washer wiper operating switch wherein a slide switch for a washer circuit and a slide switch for a wiper circuit are incorporated in one case to operate both switches in cooperation with each other by manual operation. It is another object of the present invention to provide a rear window washer wiper operating switch having a simple construction.

It is a further object of the present invention to provide a novel rear window washer wiper operating switch having features of an automatic resetting type.

It is a still further object of the present invention to provide a rear window washer wiper operating switch mountable easily on automobiles because of the switches having been incorporated in one case.

DESCRIPTION OF THE PREFERRED EMBODIMENTS

Figures 1, 2:
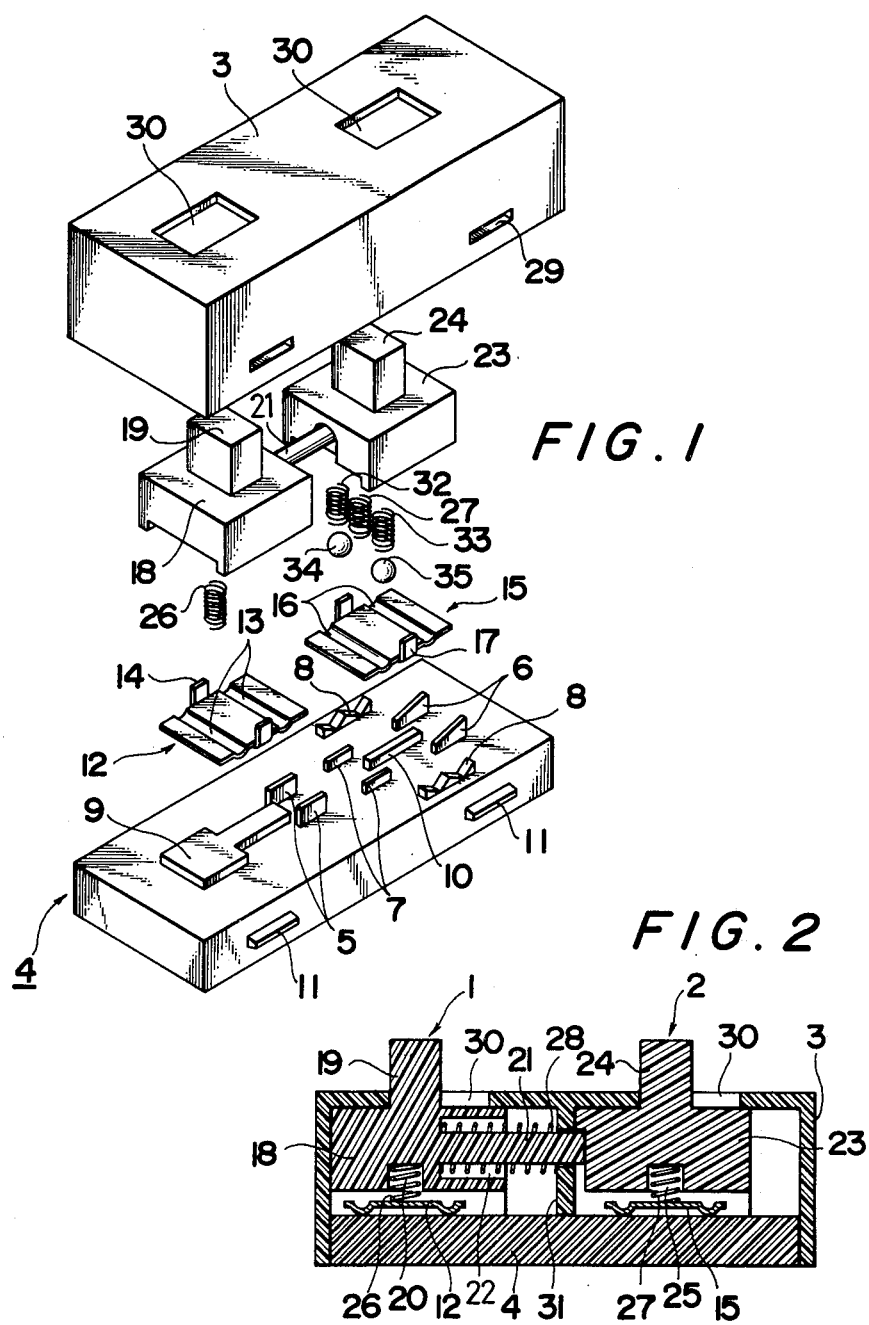
FIG. 1 is an exploded perspective view illustrating a suitable embodiment of the rear window washer wiper operating switch of the present invention.
FIG. 2 is a cross sectional view showing a suitable embodiment of the rear window washer wiper operating switch of the present invention.

Referring now to FIG. 1 and FIG. 2, there is given a detailed description of a suitable embodiment of the rear window washer wiper operating switch of the present invention.

As shown in the drawings, a slide switch 1 is provided for controlling a washer circuit, a slide switch 2 is provided for controlling a wiper circuit and a case 3 and a base board 4 are used in common for the switches. On the base board 4, a fixed contact 5 for the washer circuit, fixed contacts 6 and 7 for the wiper circuit, a toothed piece 8, embossed pieces 9 and 10 and a side protruding piece 11 are fitted.

A moving contact piece 12 is provided for the washer circuit and slides on the embossed piece 9 and the fixed contacts 5 for the washer circuit. The moving contact piece 12 for the washer circuit is made into one integral piece with two traveling contacts 13 and two rising pieces 14.

A moving contact piece 15 is provided for the wiper circuit and slides on the embossed piece 10 and the fixed contacts 6 and 7 for the wiper circuit. The moving contact piece 15 for the wiper circuit is formed substantially as one piece with two traveling contacts 16 and two rising pieces 17.

The moving contact piece 12 for the washer circuit and the moving contact piece 15 for the wiper circuit are so arranged as to enable operating with pieces 19 and 24 by inserting the rising pieces 14 and 17 thereof into the holes (not indicated by drawing) made at the backs of the first movable member 18 and the second movable member 23 respectively.

The first movable member 18 is fitted substantially with an operating piece 19 on the top thereof, a spring housing port 20 at the bottom, a projection 21 at one side and a spring housing space 22 provided around said projection 21. The second movable member 23 is provided with an operating piece 24 on the top thereof and a spring housing port 25 at the bottom substantially.

The first movable member 18 and the second movable member 23 are put substantially on the base board 4 with the moving contact piece 12 for the washer circuit and the moving contact piece 15 for the wiper circuit fitted to the respective lower portions.

In the spring housing port 20 of the first movable member 18 and the spring housing port 25 of the second movable member 23, springs 26 and 27 are inserted respectively to press the moving contact piece 12 for the washer circuit and the moving contact piece 15 for the wiper circuit.

Further, in the spring housing space 22 provided at the side of the first movable member 18, a spring 28 for automatic resetting is inserted substantially and the case 3 is secured onto the base board 4 with all of the above parts contained. The case is fitted closely to the base board with the protruding pieces 11 attached to the side periphery of the base board 4 and with the slots 29 provided in the side periphery of the case 3.

Moreover, in the surface of the case 3, a window 30 is made through which the operating piece 19 of the first movable member 18 and the operating piece 24 of the second movable member extend.

At the approximate central portion of the case 3, there is provided a window through which the projection 21 of the first movable member 18 can be passed and further the end of the spring 28 for automatic resetting is accommodated in the spring housing port 22 of the first movable member.

Moreover, there are holes (not indicated by drawing) provided at both sides adjacent to the spring housing port 25 at the bottom of the second movable member 23 to accommodate spring 32 and 33 and steel balls 34 and 35 energized by the springs. The steel balls 34 and 35 press substantially the toothed pieces 8 fitted onto the base board 4 to provide a regulating action, whereby the second movable member 23 and the moving contact piece 15 for the wiper circuit are actuated with proper regulation. A regulating device is composed substantially of the aforesaid second movable member 23, the springs 32 and 33 and further the steel balls 34 and 35 housed in the port at the bottom thereof and the toothed pieces 8 fitted onto the base board 4.

The rear window washer wiper operating switch of the present invention having the abovementioned construction operates substantially as follows.

When the operating pieces 19 and 24 are kept in inoperative condition, the first movable member 18 remains pushed back to the left in the drawing by virtue of the spring 28 for automatic resetting.

Therefore, the moving contact piece 12 for the washer circuit is separated from the fixed contacts 5 for the washer circuit. Thus, the slide switch 1 for changing over the washer circuit is in OFF state. On the other hand, in the second movable member 23, the steel balls 34 and 35 pressed by the springs 32 and 33 rest in either trough of two of the toothed pieces. Assuming now the steel balls 34 and 35 are in the left trough in the drawing, the moving contact piece 15 for the wiper circuit closes the fixed contacts 7 for the wiper circuit.

When the fixed contacts 7 for the wiper circuit are employed as a contact for the brake of a wiper motor (not indicated by drawing), the wiper operation is stopped. The fixed contacts 6 for the wiper circuit may be used for actuating the wiper motor.

Assuming now the second movable member 23 is moved to the right in the drawing from the above condition by operating the operating piece 24, the moving contact piece 15 for the wiper circuit separates from the fixed contacts 7 for the wiper circuit and comes in contact with the fixed contacts 6 for the wiper circuit to close thereof, thus actuating a wiper (not indicated by drawing).

Here, the slide switch 2 for changing over the wiper circuit is retained in the changed-over position thereof by the action of the regulating device comprising the springs 32 and 33 and further the steel balls 34 and 35 contained in the second movable member 23 and the toothed pieces 8. For stopping the wiper operation, the operating piece 24 may be operated to the left in the drawing.

The slide switch 2 for changing over the wiper circuit can thus be operated independent of the slide switch 1 for changing over the washer circuit.

Further, upon operating the operating piece 19 of the slide switch 1 for changing over the washer circuit toward the operating piece 24 when the slide switch 1 for changing over the washer circuit and the slide switch 2 for changing over the wiper circuit are both in OFF status, the moving contact piece 12 for the washer circuit comes in contact with the fixed contacts 5 for the washer circuit to close, thereby actuating a washer motor (not indicated by drawing) and further the projection 21 mounted on the first movable member 18 pushes the second movable 23 to actuate it, thereby bringing the moving contact piece 15 for the wiper circuit into contact with the fixed contacts 6 for the wiper circuit and actuating the wiper motor.

When the slide switch 1 for changing over the washer circuit is operated in the manner mentioned above, the slide switch 2 for changing over the wiper circuit, too is operated cooperatively and the result is that simultaneous operation of the washer circuit and wiper circuit is accomplished. Upon cancelling the operation of the operating piece 19, the first movable member 18 is pushed back to the original position thereof by virtue of the spring for automatic resetting 28, thus stopping the operation of washer.

However, the slide switch 2 for changing over the wiper circuit does not reset automatically since the regulating device is provided and is retained in the changed-over condition thereof. Thus, so long as the operating piece 24 is not reset by manual operation, the wiper circuit continues to work.

The rear window washer wiper operating switch of this invention has the abovementioned construction and operation and provides substantially the following advantages;

(a) Once the slide switch for changing over the washer circuit is operated, the slide switch for changing over the wiper circuit is operable cooperatively and further the slide switch for changing over the wiper circuit can be operated independently, thus enabling change-over operation for actuating the washer and wiper to be performed only with a finger.

(b) Since the slide switch for changing over the washer circuit has an automatic resetting operation, there is no possibility of the washer liquid being consumed more than required. The device that retains the slide switch for changing over the wiper circuit in the change-over position thereof makes it possible to work the wiper continuously only for the required time.

(c) Because of the slide switch for changing over the washer circuit and the slide switch for changing over the wiper circuit are contained in one case, easy installation of this operating switch on automobiles is achieved. Although the illustrative embodiment of this invention has the aforementioned features, this invention is not limited to the aforesaid embodiment and the claims thereof will be made clear by the following statement.

I claim:

1. A rear window washer wiper operating switch comprising a first slide switch for controlling a washer circuit having a movable member slideable between first and second positions and being automatically reset from said second position to said first position and a second slide switch for controlling a wiper circuit having a movable member slideable between first and second positions working in cooperation with said first slide switch to be slid from its first position to its second position when the movable member of said first slide switch is slid from its first position to its second position, the movable member of said second slide switch being slideable from its first position to its second position independently of said first slide switch and having means to retain the movable member of said second slide switch in its second position, a case containing said first slide switch and second slide switches, said first and second slide switches each having an operating piece extending through a front wall of said casing for sliding the movable member thereof between its first and second positions.

2. A rear window washer wiper operating switch according to claim 1 wherein said first slide switch comprises a first contact mounted on a base board fixed to said case, a second contact piece mounted on the movable member of said first switch making contact and separating from said first contact, the movable member of said first switch having a projection to engage the movable member of said second slide switch for sliding the movable member of said second slide switch from its first position to its second position when the movable member of said first slide switch is slid from its first position to its second position and a spring for automatically resetting the movable member of said first slide switch.

3. A rear window washer wiper operating switch according to claim 2 wherein said second slide switch comprises a fixed contact mounted on a base board fixed to said case, and a contact piece mounted on the movable member of said second switch making contact with and separating from said fixed contact for the wiper circuit.

4. A rear window washer wiper operating switch according to claim 2 or claim 3 wherein said case has a partition plate at a generally central portion separating said movable members, said projection passing through said partition, and said partition engaging one end of said spring.

5. A rear window washer wiper operating switch according to claim 1, claim 2 or claim 3 wherein the slide switch for the washer circuit and the slide switch for the wiper circuit are positioned in parallel substantially on an axis, said movable members both being slideable between said first and second positions along said axis.